United States Patent
Piacente

[15] 3,700,366
[45] Oct. 24, 1972

[54] APPARATUS FOR PRODUCING RESINOUS SHEETLIKE PRODUCTS

[72] Inventor: Anthony N. Piacente, Lawrenceville, N.J.

[73] Assignee: Congoleum Industries, Inc., Kearny, N.J.

[22] Filed: May 25, 1970

[21] Appl. No.: 40,269

[52] U.S. Cl. ............425/71, 156/62.2, 264/109, 425/223, 425/317, 425/335, 425/386, 425/96, 425/407
[51] Int. Cl. ..............................B29j 5/00
[58] Field of Search..........156/62.2, 62.4, 62.6, 62.8, 156/153, 154, 369, 370, 371, 372, 373, 374, 375, 376, 311, 390, 464, 498; 264/109, 118, 418

[56] References Cited

UNITED STATES PATENTS

| | | |
|---|---|---|
| 2,567,721 | 9/1951 | Mansfield et al. .........156/369 |
| 3,051,219 | 8/1962 | Kaiser.......................156/373 |
| 3,282,767 | 11/1966 | Greten......................156/373 |
| 3,565,725 | 2/1971 | Sempelkamp.............156/369 |
| 3,576,692 | 4/1971 | Hutz.........................156/62.2 |

Primary Examiner—Benjamin A. Borchelt
Assistant Examiner—H. J. Tudor
Attorney—Richard T. Laughlin and Shlesinger, Arkwright and Garvey

[57] ABSTRACT

An apparatus for continuously molding a resinous sheet-like product including an endless polished smooth surface belt, feed means for metering resinous chips onto the belt in substantially abutting contact and in a substantially mono-chip layer, means for heating the metered chips and the belt, means for compressing the heated chips against the belt to consolidate the chips in a sheet form which adheres to the belt, means for burnishing the sheet form, means for cooling the sheet form and the belt, and means for stripping the sheet from the belt.

14 Claims, 3 Drawing Figures

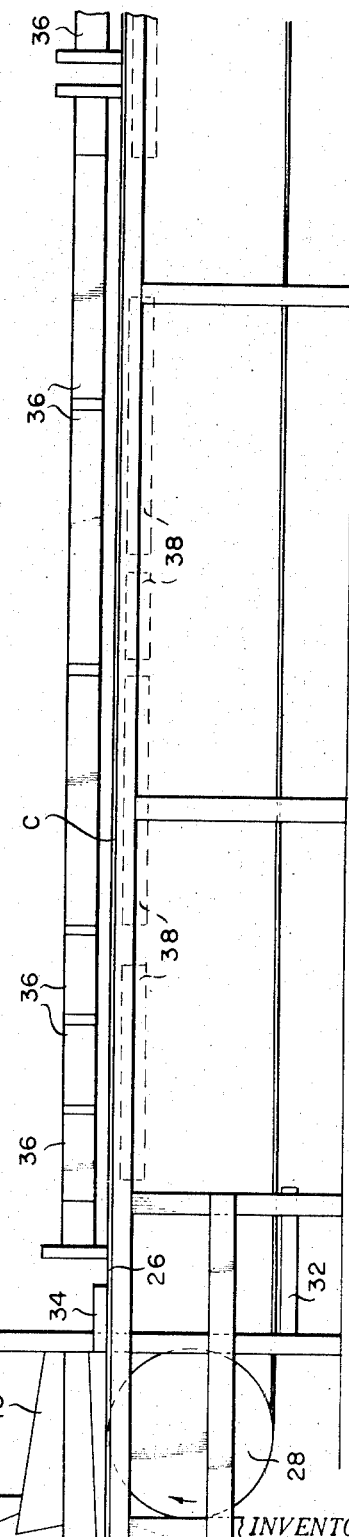
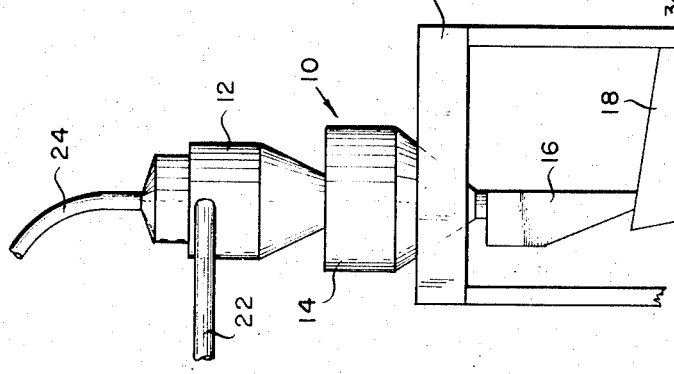
Fig. IA

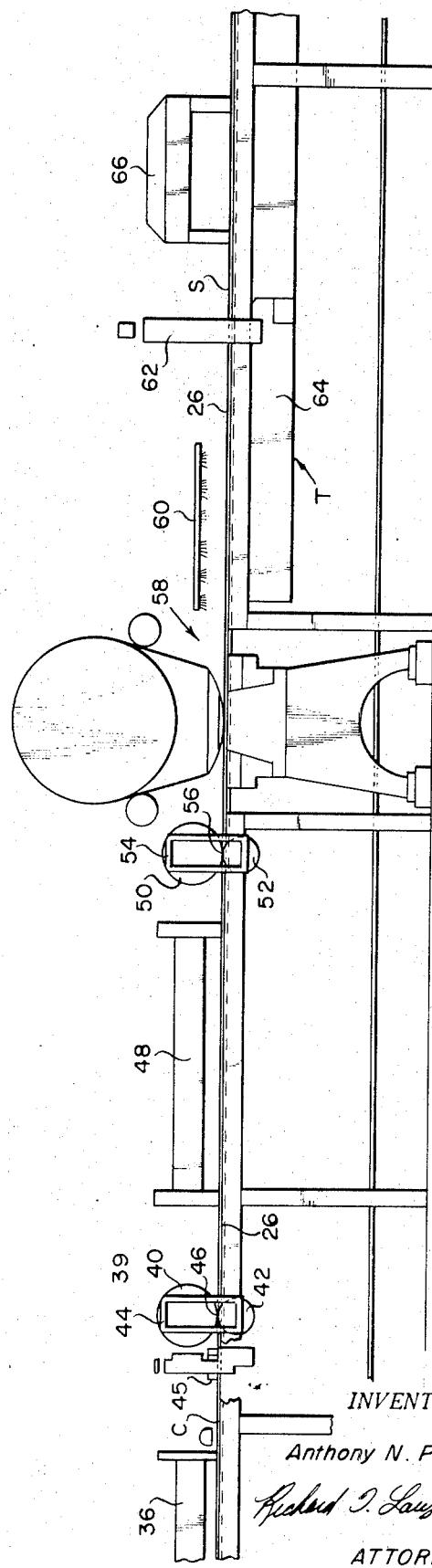

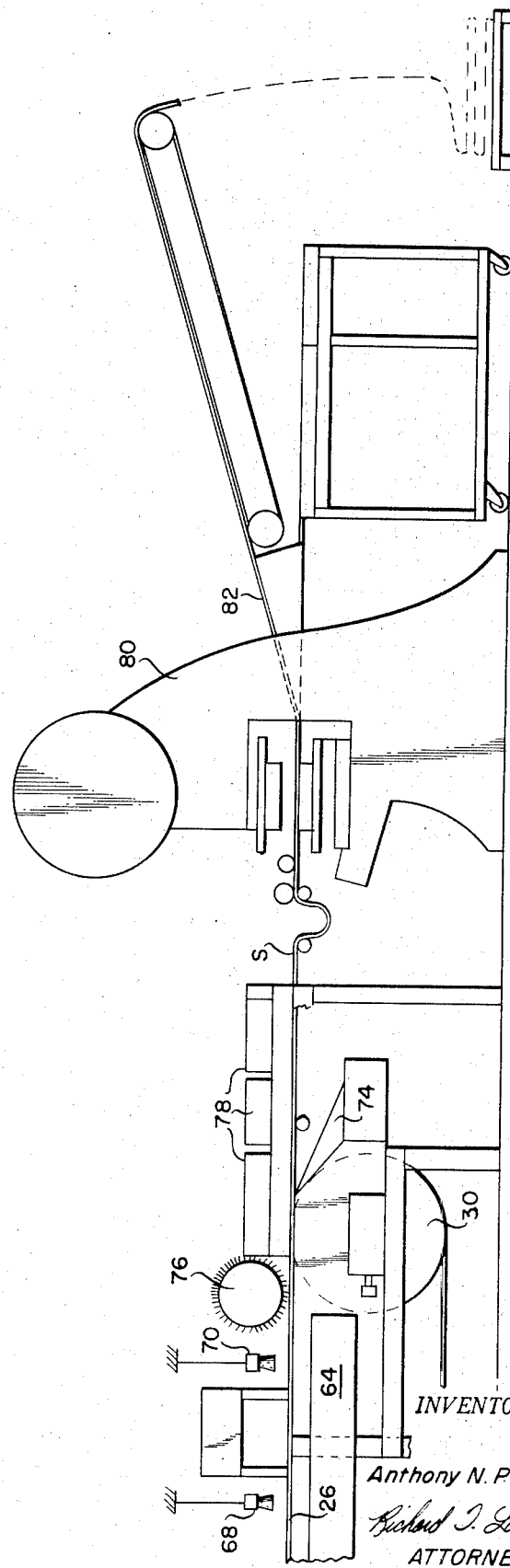

APPARATUS FOR PRODUCING RESINOUS SHEETLIKE PRODUCTS

This invention relates to a method and apparatus for producing a resinous surface covering from resinous chips.

BACKGROUND AND OBJECTS

Resinous sheet material, and more particularly vinyl sheet material, has recently become extremely common and popular as surface covering material. One of the more common types of these products is a vinyl surface covering having a decorative pattern thereon forming the wear layer. This product is utilized both in tile and in sheet form, and has found extensive usage in floor, counter top, wall, and the like coverings, and its versatility has added greatly to the popularity and demand of the product. The resinous sheeting may include a number of variations in color, pattern and texture and the like. Additionally, the product may be produced by a number of methods such as extrusion, casting and the like. Particularly, prior art techniques have disclosed methods for extruding a blend of resinous chips or by placing a blend of resinous chips in a mold and subjecting the chips to heat and pressure while in the mold.

The extrusion process for producing sheets from chips has several disadvantages in that the chips tend to blend together and cause a running of the colors between the chips, thus producing a striated appearance. However, it is extremely difficult to extrude a product from chips in which the final product has a "standstill" appearance, that is, an article which does not have a flow or grain appearance in the product. The extrusion process does tend to produce this grain-like appearance which is undesirable in many instances.

One of the difficulties encountered in the prior art type of molding processes is the expensive nature of the processes because of the batch type method employed. Obviously, this is slower than a continuous process.

Accordingly, it is a primary object of this invention to produce a resinous sheet-like product from a blend of chips in a continuous molding operation.

A further object of this invention is to produce a resinous surface covering from a blend of colored resinous chips which provides a standstill appearance.

Still another object of this invention is to provide an apparatus for producing a resinous sheet-like material utilizing an endless belt as the molding surface.

Still a further object of this invention is to provide an apparatus for continuously molding, finishing, waxing or drying a resinous sheet form.

Another object of this invention is to provide a continuous molding apparatus wherein resinous chips are deposited on a belt, heated, and consolidated into a sheet form adhering to the belt.

These and other objects and advantages of this invention will become apparent when considered in light of the following descriptions and claims when taken with the accompanying drawings in which:

FIGS. 1a, 1b and 1c are a side elevational view of the molding apparatus of this invention.

DESCRIPTION OF THE INVENTION

Referring firstly to FIG. 1a, a feed system or mechanism generally designated 10 is illustrated. The feed system 10 includes a receiving tank 12, a surge bin 14, a supply hopper 16, and a Syntron vibrating feeder 18. The feed mechanism 10 is supported by means of a frame member 20. Chips, preferably having a characteristic softness of approximately 0.023–0.026 inch indentation, are preferred to avoid subsequent belt-sheet separation problems. The McBurney Indentation Test is made and a softness of 0.015–0.032 inch is permissible, while 0.023–0.026 inch is the preferred range. The chips which are to be molded are supplied to the receiving tank 12 from a source (not shown) by any suitable means such as pneumatic conveyor lines 22 and 24.

Positioned beneath the vibrating feeder 18 is an endless belt member 26 supported by rolls 28 and 30. The belt 26 must have a smooth mirror-like surface to which the chips must adhere during processing and from which the resinous sheet which is formed must be strippable.

Preferably the belt is constructed of stainless steel, carbon steel, or heat resistant fluorocarbon-glass fiber (glass fiber belt impregnated with a fluorocarbon resin).

Beneath the belt 26 at the point just prior to the metering of the chips onto the belt is a pre-heater 32. The pre-heater is used to heat and dry the belt 26 before the chips C are deposited thereon.

The vibrating feeder 18 of the type which can be controlled so as to provide an even deposition of chips C onto the belt surface 26, so that the chips C are in substantially abutting contact, and are in a layer substantially one chip thick on the belt or approximately 3/16 inch coverage on the belt. Adjustable Teflon guide bars 34 on either side of the belt push the chips together into a sharp edge breakoff.

Downstream of the feeder mechanism 10, are provided a plurality of heaters 36 mounted above the belt 26, and a plurality of heaters 38 mounted below the belt 26. The heaters 36 and 38 are of a type, either gas or electric, which may be individually controlled so as to provide even heating of the chips C and the belt 26. The heaters 36 may preferably be angled across the belt to provide uniformity of heating.

Referring now to FIG. 1b, a consolidator 39 includes a pair of consolidating rolls 40 and 42 mounted on a roll frame 44 so as to provide a nip 46 for the chips C and the belt 26 and a pair of laterally adjustable compactor blades 45 on either side of the belt 26 maintain proper flow of the chips into the consolidator 39. Proper adjustment of the consolidator 39 and the vibratory feeder 18 is necessary to produce a sheet out of the consolidator 39. As the chips C and the belt 26 pass through the consolidating nip 46, the chips C are fused into a sheet form S which is adhered to the belt 26. The sheet S and the belt 26 are heated again by means of a heater 48, and are then passed through a second pair of consolidating or calendering rolls 50 and 52 mounted on a frame 54, the rolls 50 and 52 defining a nip 56 through which the belt 26 and the sheet S passes. After passing through the nip 56, the sheet is completely formed, and is next subjected to finishing operations. The temperatures of the sheet S at consolidation should not be over about 330° F to avoid excessive sticking to the belt 26 when it is subsequently stripped therefrom (supra).

A burnishing apparatus 58 is provided adjacent the rolls 50 and 52 and this apparatus is of the type disclosed in copending application Ser. No. 24,519, filed Apr. 1, 1970, for a "Method and Apparatus for Finishing Resinous Surface Coverings." The burnishing apparatus 58 finishes the surface of the sheet S.

After the burnishing operation, the sheet S passes through a cooling section T and is subjected to a cooling spray of an air-water mixture by means of a spray nozzle 60. This cooling is done to permit proper waxing of the sheet S as it passes through the drip tube oscillating waxer 62. Positioned below the belt 26 is a cooling trough 64 which serves to cool the belt near the end of the processing line. The trough would contain a suitable coolant such as water or ethylene glycol. The temperature of the cooling section T should be not over approximately 45° F so as to avoid excessive sticking of the sheet S on the belt 26 during stripping operation (supra) and permit release of the sheet S from the belt 26.

After the sheet has been waxed, it passes beneath the fan heater 66 to dry the wax. Two sets of lamp heaters 68 and 70 and an additional fan heater 72 are also used to dry the wax when required as seen in FIG. 1c. After the heaters 68, 70 and 62 have dried the sheet S, a buffing brush 76 polishes the surface of the sheet S. The sheet S is then stripped from the belt 26 by any suitable means such as stripper 74. Additional heaters 78 are now utilized to raise the temperature of sheet s after it has been stripped. The sheet S is stripped from the belt 26, it now passes through a cutting press 80 which cuts the sheet into tiles which may then be packaged. The cutting temperature of the Sheet S should be about 110° F. to 115° F. Cutting temperatures of about 120° F and above cause dimensional problems in the tiles produced. The tiles are removed from the grid 82 by any suitable means after it leaves the press 80 and the grid 82 remaining after the tiles are cut is reclaimed, and may be reground into chips and recycled to the feed system 10 for reprocessing.

In utilizing the method and apparatus of this invention, it is imperative that the chips be adhered to the sheet as they pass through the consolidated rolls 40, 42, 50 and 52 in a single mono-layer. This provides a standstill appearance in the final product, and no grain or flow may be seen in the tiles thus produced. If the chips were allowed to slide relatively to the belt, or in a vertical fashion downwardly under compaction relative to each other where piled one on another a striated or flowing appearance would result in a final product, and the standstill effect would not be obtained. Thus the chips are randomly oriented in the final product and a clear definition between the chips is provided. Additionally, since the chips properly adhere to the belt, there is proper release and no stick or wrap of the chips on the consolidating rolls which are rotating at the same speed as the belt.

It should be noted that the maximum speed of the belt 26 at which the optimum results are obtained will be governed by the ability of the system to obtain the desired processing conditions required to properly consolidate the chips into a sheet and the stripping of said sheet from the belt.

While this invention has been described, it will be understood that it is capable of further modification, and this application is intended to cover any variations, used and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An apparatus for continuously molding a resinous sheetlike product including:
   a. an endless polished smooth surface belt,
   b. vibrator feed means for metering resinous chips onto said belt in substantially abutting contact and in a substantially mono-chip layer,
   c. means for heating said metered chips and said belt,
   d. means for compressing said heated chips against said belt to consolidate said chips in a sheet form which adheres to said belt,
   e. means for burnishing said sheet form,
   f. means for cooling said sheet form and said belt, and
   g. means for stripping said sheet form from said belt.

2. An apparatus for continuously molding a resinous sheetlike product as in claim 1 and wherein:
   a. said heating means includes a plurality of heaters.

3. An apparatus for continuously molding a resinous sheetlike product as in claim 2 and including:
   a. a first series of heaters above said belt,
   b. a second series of heaters below said belt, and
   c. said first and second series of heaters being positioned ahead of said compressing means.

4. An apparatus for continuously molding a resinous sheetlike product as in claim 3 and wherein:
   a. said first series of heaters extends beyond said compressing means.

5. An apparatus for continuously molding a resinous sheetlike product as in claim 4 and including:
   a. additional heater means positioned ahead of said vibrator feed means for preheating said belt.

6. An apparatus for continuously molding a resinous sheetlike product as in claim 5 and wherein:
   a. each of said first and second series of heaters and said additional heater means comprises electric heaters.

7. An apparatus for continuously molding a resinous sheetlike product as in claim 5 and wherein:
   a. each of said first and second series of heaters and said additional heater means comprises gas heaters.

8. An apparatus for continuously molding a resinous sheetlike product as in claim 5 and wherein:
   a. said compressing means includes a first series of compressing rolls and a second series of compressing rolls, said second series of compressing rolls being spaced downstream from said first series of compressing rolls, and
   b. said first series of heaters extends to said second series of compressing rolls.

9. An apparatus for continuously molding a resinous sheetlike product as in claim 8 and including:
   a. means downstream of said burnishing means for waxing the surface of said sheet form.

10. An apparatus for continuously molding a resinous sheetlike product as in claim 9 and wherein:

a. said belt comprises a stainless steel belt.

11. An apparatus for continuously molding a resinous sheetlike product as in claim 9 and wherein:
a. said belt comprises a carbon steel belt.

12. An apparatus for continuously molding a resinous sheetlike product as in claim 9 and wherein:
a. said belt comprises a fluorocarbon-glass fiber belt.

13. An apparatus for continuously molding a resinous sheetlike product as in claim 8 and including:
a. guide bar means adjacent said vibrator feed means for positioning said chips laterally on said belt.

14. An apparatus for continuously molding a resinous sheetlike product as in claim 13 and including:
a. compactor means ahead of said compressing means for compacting said chips laterally inwardly.

* * * * *